Nov. 14, 1950 H. A. KELLY, SR 2,530,245
PLASTIC MOLDING APPARATUS
Filed June 5, 1946 3 Sheets-Sheet 3

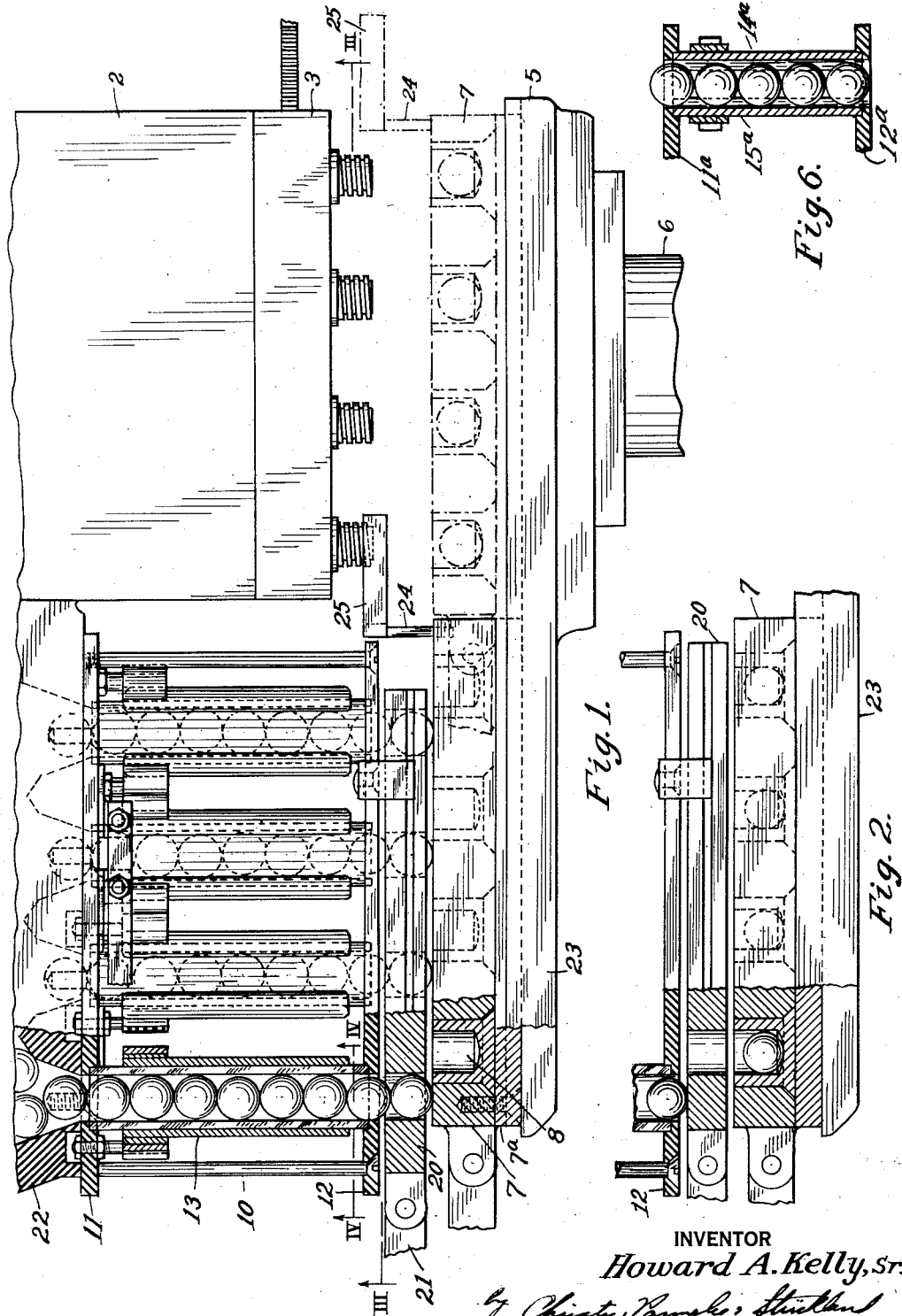

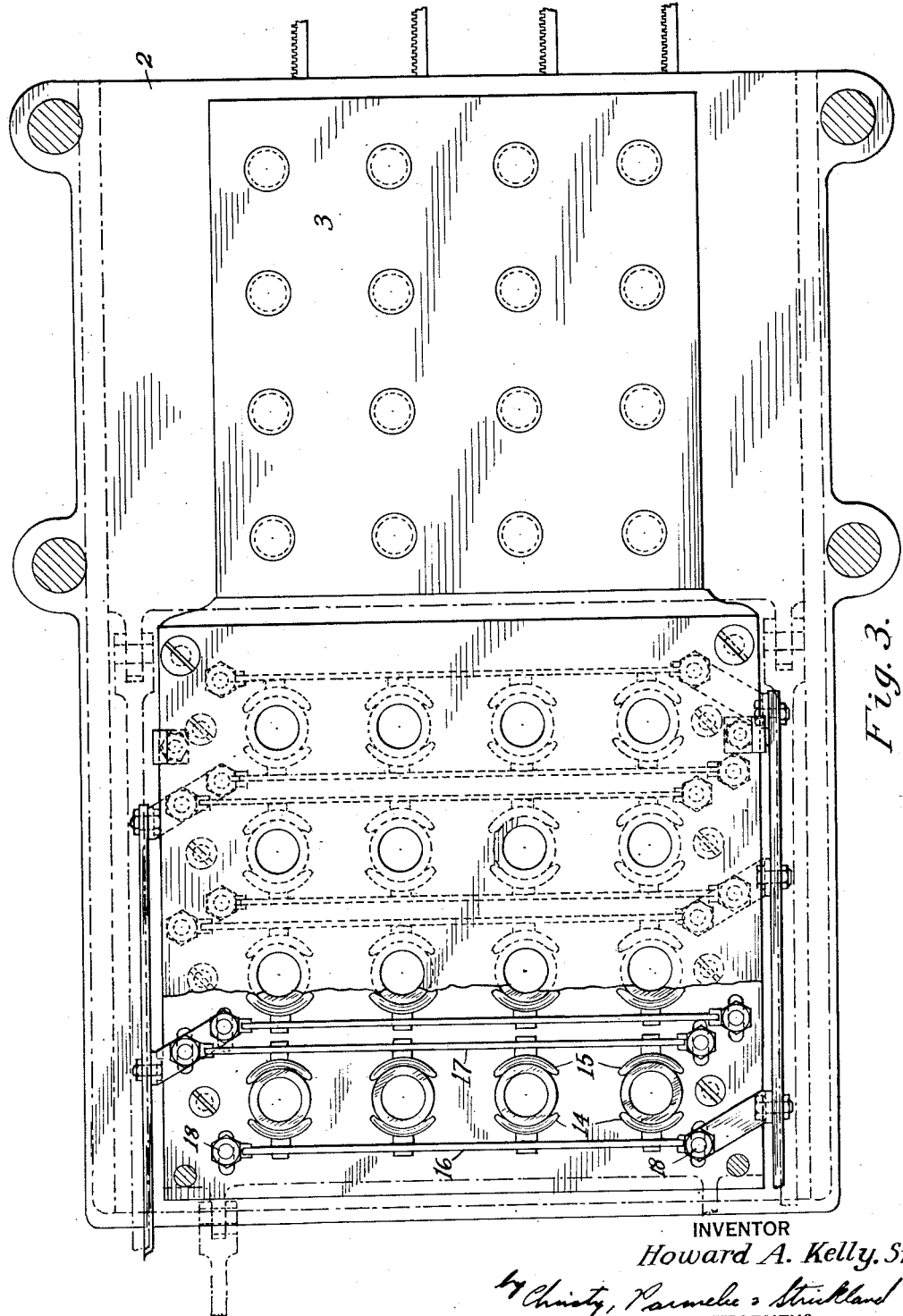

INVENTOR
Howard A. Kelly, Sr.
by Christy, Parmelee & Strickland
ATTORNEYS

Patented Nov. 14, 1950

2,530,245

UNITED STATES PATENT OFFICE 2,530,245

PLASTIC MOLDING APPARATUS

Howard A. Kelly, Sr., Wheeling, W. Va., assignor to Wheeling Stamping Company, Wheeling, W. Va., a corporation of West Virginia Application June 5, 1946, Serial No. 674,581

7 Claims. (Cl. 18—1)

This invention relates to an apparatus for the molding of articles from plastic materials wherein the plastic composition is simultaneously subjected to the action of heat and pressure, and it is especially applicable, although not limited, to the molding of thermosetting resinous plastics. The invention has for its object to accelerate the molding cycle of the press by pre-heating the charge of molding compound before it is placed in the mold cavity.

It is well known to those skilled in the art that in the molding of articles from thermosetting resins the molding compound must be simultaneously heated and held under pressure in order to cure or polymerize the resin. For this purpose the molds are heated so that the charge within the molds can be kept at a proper temperature while the molds are closed. The time during which the mold must be held closed varies according to the size and shape of the article being molded and the type of molding compound being used, but normally the press remains closed for about a minute for thin wall pieces. In the making of small articles, as for example the molding of bottle caps, multiple molds are used so that each time the molding press closes a large number of articles are made. If the molding cycle is speeded up so that for example the press remains closed only half as long, the number of pieces made on the same equipment in a given period of time may be substantially increased, or the same number of pieces can be made using a smaller press and fewer mold units, and the present invention pertains to the method and apparatus for speeding up this cycle.

It is at the present time well known in the art that the plastic molding compound may be shaped into pellets which are commonly referred to in the art as "pre-forms." It is also well known in the art that these pre-forms may be heated by placing them between metal plates which are oppositely charged by a high-frequency generator. When the pellets are placed between two such plates and the generator is operated, the pellets may be preliminarily heated and the heating will occur uniformly throughout the mass, rather than from the outside toward the center as would be the case if the pellets were merely charged into an oven or other hot atmosphere. This is desirable because when heat from an external source is used, the plastic at the surface begins to cure before the center becomes warm.

The high frequency heating of the pre-form initiates the polymerization of the resin in the molding compound, and if the heating is carried too far the molding properties of the plastic will be destroyed or seriously impaired. Likewise, if the pre-form is heated and then not quickly charged into the mold and pressed, the residual heat in the pre-form will cause polymerization to continue to an undesirable extent.

In the commercial application of high frequency heating the pre-forms are placed in the electrostatic field between two flat plates, and after a period of heating, they are transferred by the operator as quickly as possible to the mold cavities of the press. One batch of pre-forms may be heating while another previously heated batch is being pressed.

While this results in some shortening of time in the molding cycle, the molding cycle is still considerably limited by the speed with which the operator can work, and also different operators transferring the pre-forms from the electrical apparatus to the press at different speeds introduce the plastic into the molds in relatively different stages of polymerization, and there is moreover non-uniformity in the rate at which any one operator works.

The present invention provides an arrangement whereby the articles may be charged directly from the electrical equipment into the mold cavities without the operator having to manually carry them from one station to another, and provides a mechanism which is adaptable for use with automatic presses, whereby each operating cycle is uniform in all respects with all others. Such apparatus, moreover, enables each charge or pre-form to be heated to exactly the same extent. The invention further provides an arrangement whereby the apparatus may be changed to accommodate pre-forms of different sizes in the making of different sized pieces, and if necessary, more than one pre-form may be fed into the cavity at a time, as may be the case in molding larger pieces for which a single pre-form is not adequate.

According to my invention, there are provided one or more channels or tubes, preferably vertical or inclined so that pre-forms may move by gravity therethrough, and if the press has more than one cavity to be charged at a time, the number and spacing of the channels is comparable in number and spacing to the number and spacing of cavities in the multiple mold. A transfer mechanism including a shuttle plate or like arrangement is conveniently provided whereby one pre-form may be dropped simultaneously from the bottom of each channel or tube, the pre-forms being charged into the tops or outer ends of these tubes and contacting one another. Upon being discharged from the tubes, the preforms may fall directly into mold or mold cavities, or into an appropriate charging mechanism co-operating with the mold. Each channel or tube is positioned between plates or electrodes which are connected with opposite sides or poles of a high-frequency generator. The column of preforms in each tube or channel may thus be kept in a high-frequency electrostatic field for a period of time depending upon the length of the column and the rate at which the preforms are discharged from the bottom of the columns. The intensity of the electrostatic field and the length of the plates is co-related to the operating speed of the press so that such preforms will be in the electrostatic field for a length of time just sufficient to bring the pre-forms to a proper preheat, whereupon the pre-forms will be immediately entered in the press and molded.

The invention may be more fully understood by reference to the accompanying drawings showing a multi-mold press in which:

Fig. 1 represents a transverse vertical section through a press and charging mechanism embodying my invention;

Fig. 2 is a fragmentary view, partly in section and partly in elevation of the charging mechanism;

Fig. 3 is a horizontal section looking upwardly in substantially the plane of line III—III of Fig. 1, but with a portion of the preheating unit broken away;

Fig. 6 is a modification of the construction wherein the tubes of insulation are omitted, the vertical channels being formed directly by the electrodes.

Figure 4:
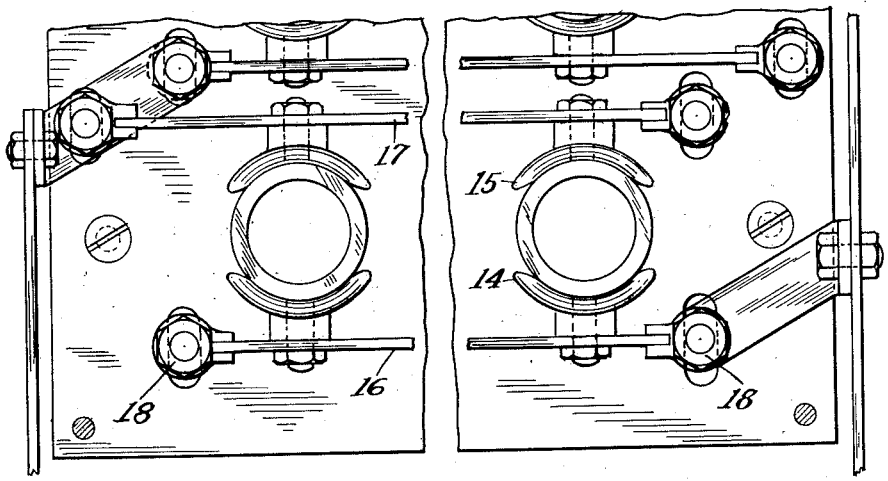
Fig. 4 is a fragmentary view on a larger scale showing some of the tube elements and electrodes constituting the preheating and charging mechanism, the view being a section in the plane of line IV—IV of Fig. 1.

Referring to the drawings, 2 designates the upper part of a conventional hydraulic molding press having a mold plate 3 thereon having a number of positive mold elements or force pins 4 thereon, the particular mold illustrated being for the forming of plastic bottle caps, whereon racks are provided to turn the force pins to unscrew, or partly unscrew the finished pieces. It will be understood, however, that this is merely by way of illustration, and that the positive mold elements might be otherwise constructed. The upper mold member and the upper mold plate is fixedly supported in the housing of the press, which housing is not shown, such construction being well known to those skilled in the art. The lower press member or platen 5 is supported on a ram 6 which is usually hydraulically operated so that it can be moved toward and away from the upper mold member. The press is illustrated as being of the type in which the lower press platen has a lower mold plate 7 which is movable horizontally in a fore-and-aft direction from a position between the press platens, indicated in dotted lines in Fig. 1 to a charging position at one side of the platens.

In Fig. 1 the lower mold 7 is shown in a charge receiving position. The lower mold has a number of negative mold elements or cavities therein, the number and position of negative mold elements corresponding to the number and position of the positive mold elements, both groups of elements being arranged in longitudinal and transverse rows. For illustration I have indicated a multiple mold having 16 individual mold units, there being 4 units in a row crosswise and 4 units in a row lengthwise. In practice there may be a great many more mold units.

So much of the press as has been heretofore described is known in the art and does not constitute per se any part of the present invention.

According to the present invention there is positioned to one side of the press, so as to extend over the mold plate 7 when it is in the full line position shown in Fig. 1, the preform charging and pre-heating unit constituting the present invention and designated generally as 10. This pre-heating and feeding mechanism 10 comprises an upper plate 11 and a lower plate 12, both of which may be, but do not have to be, formed of insulating material. There are a number of vertical tubes 13 supported by the plates 11 and 12, the upper ends of the tubes 13 being seated in recesses around openings in the upper supporting plate 11, and the lower ends of the tubes being seated in recesses around openings in the lower plate 12. The tubes 13 are of some high dielectric material, as for example glass, preferably one of the heat-resisting or borosilicate glasses, but they may also be of steatite porcelain or like high insulating material. The tubes 13 are spaced in transverse and longitudinal rows, the spacing corresponding exactly to the spacing of the cavity elements 8 in the lower mold plate 7 and the internal diameter of each tube is such as to accommodate a pre-form of the diameter necessary to be received in the cavities 8.

Figure 5:
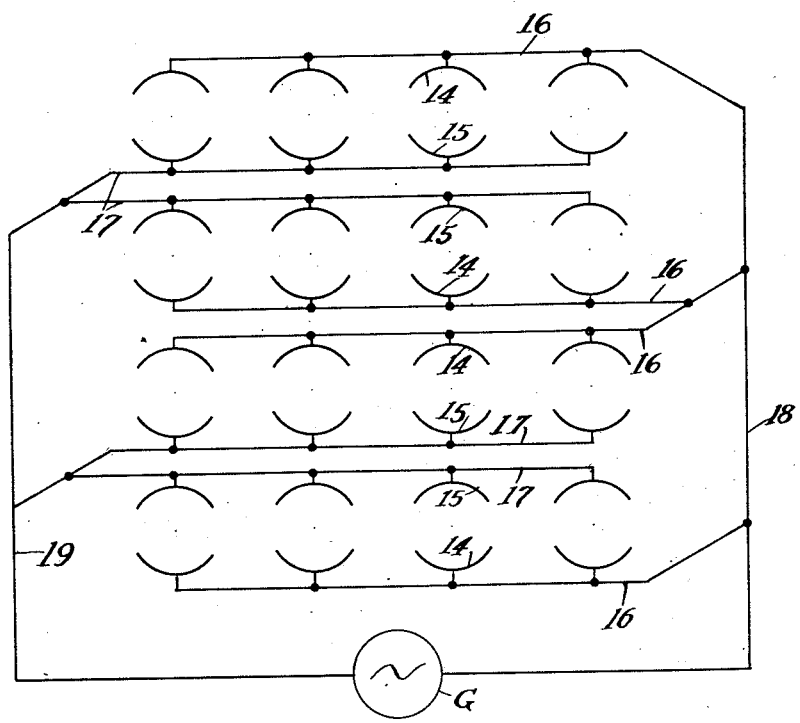
Fig. 5 is a circuit diagram for the electrostatic unit.

Extending along one side of each of the tubes 13 is a metal plate 14, the plates being curved generally to conform to the curvature of the tube. Opposite the plate 14 is a similar plate 15. All of the plates 14 in a single row are connected to a common conductor or bus-bar 16. All of the plates 15 are likewise connected to a conductor or bus-bar 17. The bus-bars 16 and 17 are carried on vertical posts 18 at the ends thereof, the supporting plates 11 and 12 being slotted to enable adjustment of the conductors 16 and 17, and their respective plates 14 and 15 toward and away from each other for the accommodation of tubes of different diameters within a restricted range. As shown in Fig. 5 all of the bus-bars 16 are connected to one side of a high-frequency generator G through conductors 18, and all of the bus-bars 17 are connected through conductor 19 with the opposite side of the high-frequency generator. I have found frequencies in the range between 5 and 30 megacycles to be satisfactory. In the assembly, so far as is possible, plates of like potential in the different rows are arranged back-to-back so as to avoid the bus-bars 16 and 17 of opposite potential between any two rows of tubes.

Below the lower plate 12 there is a transfer plate 20 of any suitable construction for transferring pre-forms from the several tubes into the corresponding mold cavities. In Fig. 2 the transfer plate comprises merely a gate having openings therein spaced to correspond and register with the openings in the plate 12 and to be brought into register with the cavity 8 in the lower mold plate 7 when the same is moved to the full line position. The transfer plate 20 may be operated in any suitable manner, there being shown an operating connection or link 21. It moves back and forth in a horizontal plane. Normally it is in a position where the top of the plate 20 closes the bottoms of the tubes 13, the holes therein at such time being out of register with the bottoms of the tubes. After the mold plate 7 has been moved to the position shown in Fig. 1, the plate 20 is operated to bring its holes into register with the bottom of the tubes, whereby a single pellet drops down into each of the holes. The plate is then shifted until the holes register with the tops of the cavities 8, whereupon the bottoms of the tubes 13 are again closed while the pellets in the holes in the transfer plate drop into the mold cavities 8. Thereupon the mold 7 may be returned to its operating position over the lower press platen.

Instead of having transfer plate 20 move a limited distance, it is of course possible to use an arrangement in which the lower mold plate remains stationary and the transfer plate moves from a charge-receiving position to a position between the press platens, as disclosed for example in McGinnis application, Serial No. 379,436, filed February 18, 1941, now Patent No. 2,412,411.

Above the plate 11 there may be an appropriate charging hopper 22 for constantly supplying pre-forms to the several tubes. Conveniently the hopper and the pre-heating assembly are made separately so that the pre-heating assembly can be removed from time to time when it is desired to change the diameter of the tubes.

The lower mold plate 7 is mounted on a slide plate 7a and the rails on which the plate 7a moves are designated 23 and there is one of them at each side of the lower press platen 5. These rails are spaced sufficiently wide apart so that when they are lifted by the raising movement of the lower press member they will pass to the side of the charging tray 20 and the pre-form pre-heating assembly.

In the operation of the machine, assuming the parts to be in the position shown in Fig. 1, in the next operation the plate 20 will move to the right so as to bring each hole in the plate 20 over one of the cavities 8. This drops a pre-form into each cavity, and at the same time closes off the bottom of each tube 13 to prevent additional pre-forms from dropping down. The lower mold plate is then moved toward the right to its operation position above the lower press platen 5. The press platen then raises until the upper and lower molds are closed, whereupon the plastic charges in the mold cavities are shaped and cured. The lower press platen then drops down, lowering slowly at first, and then rapidly. During the initial part of the lowering the threaded force pins or positive mold elements may be rotated as is well understood in the art (see for example Rahm Patent No. 1,944,571, dated January 23, 1934), to partially or completely unscrew the formed pieces. If the formed pieces are partially unscrewed, the lower mold plate may carry other stripping means as for example a frame 24 having parallel wipers 25 thereon, one wiper being provided for each row of pins. When the mold plate 7 shifts back to the position shown in Fig. 1, these wipers will be drawn in progressively past the several force pins contacting the peripheries of the caps to complete the unscrewing of them. The caps so unscrewed may drop onto the press platen 5 and be pushed off on the return movement of the lower mold plate. The particular mechanisms referred to may be changed within wide limits. The essential feature of my invention is the provision of a charging mechanism providing channels through which the pre-forms are progressively delivered to the mold cavities with electrodes to establish and maintain a high-frequency field through which the pre-forms travel. The frequency may be comparable to that now used in heating pre-forms. The frequency and current density and length of the electrodes is adjusted to the time cycle of the press so that the pre-forms will be in the electrostatic field long enough to be heated to a proper extent, but not long enough to produce undesirable over-curing. The charging apparatus is so constructed that the lowermost pre-form is always the hottest, and it is delivered rapidly from the bottom of the column into the mold cavity. The press may be adjusted as is well known in the art to regular time cycle so that each pre-form is uniformly pre-heated and the time elapsing between the point where the pre-forms initially heat and they are finally pressed will be uniform.

It is important from the standpoint of my invention that the pre-forms are transferred directly from the heater adjacent the press to the mold cavities quickly and with a minimum of lost time.

While it is preferred that the channels through which the pre-forms move between the electrodes include cylindrical tubes such as glass or ceramic tubes 13, these tubes may be eliminated and the pre-forms may move directly between and in contact with the electrodes as indicated in Fig. 6 which shows a single channel which is otherwise fragmentary, but wherein 14a and 15a designate a pair of curved electrodes in spaced relation to each other extending between plates of insulating material 11a and 12a, the curved plates providing channels through which the pre-forms move. The pre-forms being of electrically non-conductive material, are not destroyed by contact with the plates 14a and 15a. Since, however, the moisture content in the pre-forms may vary, higher potentials and more effective heating can be provided where the pre-forms are confined in tubes of insulating material. Also where the pre-forms contact the metal electrodes there is danger of them partly fusing to the electrodes, causing a building up of a deposit which interferes with the motion of the pre-forms through the channel, and which may result in the current arcing over from one plate to the other. Whether the tubes are used or not, however, is largely a matter of adjustment of the electrical circuits, and of other mechanical factors. Generally, however, the provision of the tubes 13 is preferable, first, since the tubes themselves do not heat to the same extent that the plastic pre-forms do, and the current loss from the heating of the tubes is small, while the operating conditions are less critical where these tubes are provided.

I have shown a more or less complete installation for operation in accordance with my invention. Good electrical design to avoid excessive current losses, indicates that the electrical equipment be appropriately spaced or positioned with respect to the press and that adjacent metal masses be minimized, as will be understood by the electrical engineer, and various specific changes may be made with these ends in view. Also, it will be apparent that the tubes may be at an angle or other position for the progressive movement of a succession of pre-forms therethrough. Also, the parallel connection of all of the plates may not always be electrically desirable and the connection may be other than the particular parallel connection described.

In the present preferred embodiment herein specifically described, provision is made for charging several mold cavities at once, but if the machine be of a type in which there is only a single cavity, or a succession of cavities which are progressively charged, a single heating unit in lieu of multiple units may be employed. Also, with some objects two or more pre-forms may be charged into a cavity where one pre-form is not sufficient, and my invention is applicable to such conditions, this being entirely a matter of size of the pre-forms and the design of the transfer or gate mechanism.

While I have illustrated and described certain specific embodiments of my invention and the method of practicing the same, it will be understood that this is by way of illustration and that various changes and modifications may be made within the contemplation of my invention and within the scope of the following claims.

I claim:

1. In combination with a plastic molding machine including a press having a plurality of spaced mold cavities, hopper means for simultaneously feeding and electrostatically heating a plurality of pre-forms comprising a plurality of pairs of vertically extending electrodes defining spaced vertical channels, a transfer plate extending below said channels and having a plurality of apertures having the same spacing as said channels and adapted to be moved horizontally into or out of registry with said channels in timed succession so as to laterally discharge the bottom pre-forms of said stacks, a mold plate underneath said transfer plate having a plurality of mold cavities which have the same spacing as said transfer plate and into which mold cavities the bottom pre-forms of said stacks may be singly fed in succession by the horizontal reciprocating movement of said transfer plate, and means for moving said mold plate horizontally, after being charged with pre-forms, into position for engagement with a second mold plate of said press to effect the molding operation.

2. Apparatus recited in claim 1 wherein said pairs of electrodes are simultaneously adjustable to provide adjustable channel widths to accommodate different pre-form widths.

3. Apparatus recited in claim 1 together with a hollow cylindrical vitreous tube surrounded by each pair of electrodes and of slightly greater diameter than the pre-forms.

4. In a press for molding plastic pre-forms, the combination comprising a die plate having a mold cavity therein, a structure in which the pre-forms are stacked including a pair of electrostatic plates respectively positioned on opposite sides of the stack of pre-forms and having a length such that a plurality of pre-forms are positioned between said plates, means for supplying an alternating high frequency current to said plates for subjecting the pre-forms to the action of an alternating electrostatic field to heat the pre-forms, and means for transferring said pre-forms in succession from said stack to said cavity for a molding operation thereon, the successive transfer of pre-forms from said stack operating to control the speed of movement of the pre-forms with respect to said plates and thereby the time to which they are subjected to the heating action of the electrostatic field.

5. In a press for molding plastic pre-forms, the combination comprising a pair of opposed and elongated high frequency heating electrodes defining a vertically extending space therebetween through which a stack of pre-forms may gravitate, said electrodes having a length such that a plurality of pre-forms are subjected simultaneously to the heating action of their electrostatic field, a transfer plate underneath said stack having an opening therein for the reception of the bottom pre-form of the stack and movable horizontally to discharge the bottom pre-form from said stack, a mold plate under the transfer plate in a pre-form charge receiving position and having a mold cavity therein into which the bottom pre-form is fed by said transfer plate upon horizontal movement thereof, and means for moving said mold plate horizontally from its pre-form receiving position to an operative molding position.

6. In a press for molding plastic pre-forms, the combination comprising a pair of opposed and elongated high frequency heating electrodes defining a vertically extending space therebetween through which a stack of pre-forms may gravitate, said electrodes having a length such that a plurality of pre-forms are subjected simultaneously to the heating action of their electrostatic field, a die plate having a mold cavity therein, and transfer means for successively moving the bottom one of said pre-forms out of said stack and into said mold cavity to control the rate at which the pre-forms gravitate through said space and the amount of heating to which they are subjected by said electrodes.

7. In a press for molding plastic pre-forms, the combination comprising a plurality of pairs of opposed and elongated high frequency heating electrodes, each of said pairs defining a vertically extending space through which a stack of pre-forms may gravitate, said electrodes having a length such that a plurality of pre-forms are subjected simultaneously to the heating action of their electrostatic field, a die plate having a plurality of mold cavities therein corresponding in number and spacing to the spaces defined by said electrodes, and transfer means for successively transferring the bottom pre-form in each of said stacks to one of said cavities to control the rate at which the pre-forms gravitate through said spaces and the heat imparted thereto by said electrodes.

HOWARD A. KELLY, Sr.

REFERENCES CITED

The following references are of record in the file of this patent:

UNITED STATES PATENTS

| Number | Name | Date |
|---|---|---|
| 1,760,234 | Frederick | May 27, 1930 |
| 1,972,050 | Davis | Aug. 28, 1934 |
| 2,231,457 | Stephen | Feb. 11, 1941 |
| 2,287,277 | Ryder | June 23, 1942 |
| 2,329,188 | Denneen et al. | Sept. 14, 1943 |
| 2,339,607 | Smith | Jan. 18, 1944 |
| 2,347,971 | Sayre | May 2, 1944 |
| 2,401,277 | Stratton | May 28, 1946 |
| 2,404,474 | Collins | July 23, 1946 |
| 2,411,254 | Frank | Nov. 19, 1946 |
| 2,467,440 | Meharg et al. | Apr. 19, 1949 |

OTHER REFERENCES

Plastics, June 1944, "Electronic Heating of Preforms," pages 42 to 46.

Thermex, 1944, No. 2P.